United States Patent
Hiraya et al.

(10) Patent No.: US 7,475,675 B2
(45) Date of Patent: Jan. 13, 2009

(54) IN-CYLINDER DIRECT FUEL-INJECTION ENGINE

(75) Inventors: Koji Hiraya, Kanagawa (JP); Masahiro Fukuzumi, Kanagawa (JP); Toshiya Kono, Kanagawa (JP); Hirofumi Tsuchida, Kanagawa (JP)

(73) Assignee: Nissan Motors Co., Ltd., Yokohama (JP)

( * ) Notice: Subject to any disclaimer, the term of this patent is extended or adjusted under 35 U.S.C. 154(b) by 0 days.

(21) Appl. No.: 11/582,672

(22) Filed: Oct. 18, 2006

(65) Prior Publication Data
US 2007/0084436 A1 Apr. 19, 2007

(30) Foreign Application Priority Data
Oct. 19, 2005 (JP) .............................. 2005-304731

(51) Int. Cl.
*F02M 61/14* (2006.01)
*F02M 61/16* (2006.01)

(52) U.S. Cl. ...................................... 123/470
(58) Field of Classification Search .................. 123/470, 123/305, 299, 468, 469, 456, 295, 467, 41.32
See application file for complete search history.

(56) References Cited

U.S. PATENT DOCUMENTS

| 2004/0065295 | A1* | 4/2004 | Hanawa et al. | 123/305 |
| 2005/0098145 | A1* | 5/2005 | Tsuchida et al. | 123/299 |
| 2005/0211225 | A1* | 9/2005 | Oguma | 123/470 |
| 2006/0032478 | A1* | 2/2006 | Tayama et al. | 123/305 |
| 2007/0039588 | A1* | 2/2007 | Kobayashi | 123/304 |

FOREIGN PATENT DOCUMENTS

| EP | 0964151 | 12/1999 |
| EP | 1319822 | 6/2003 |
| JP | 10-220229 | 8/1998 |

OTHER PUBLICATIONS
EP Search Report #06255371.4-1263 dated Feb. 27, 2006.
* cited by examiner

*Primary Examiner*—Mahmoud Gimie
(74) *Attorney, Agent, or Firm*—Global IP Counselors, LLP

(57) ABSTRACT

An in-cylinder direct fuel injection engine is disclosed. The engine comprises a fuel injection valve engaged in a fuel injection hole, a cylinder head, and an ignition plug engaged in an ignition hole, The fuel injection valve is attached to the fuel rail and the fuel injection nozzle injects fuel from the fuel rail. The fuel injection hole and the ignition hole are positioned in a central portion of the a roof of the cylinder head so as to be located between an intake and exhaust air ports and are generally aligned along an axis of a crank shaft.

14 Claims, 6 Drawing Sheets

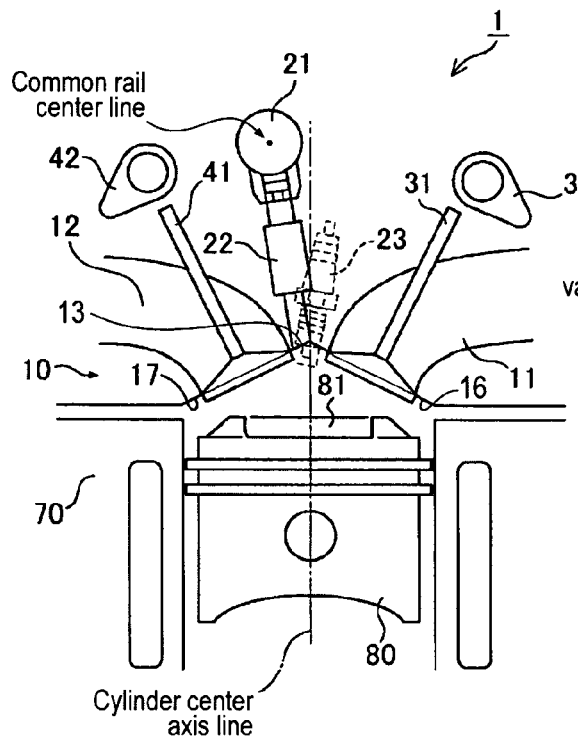
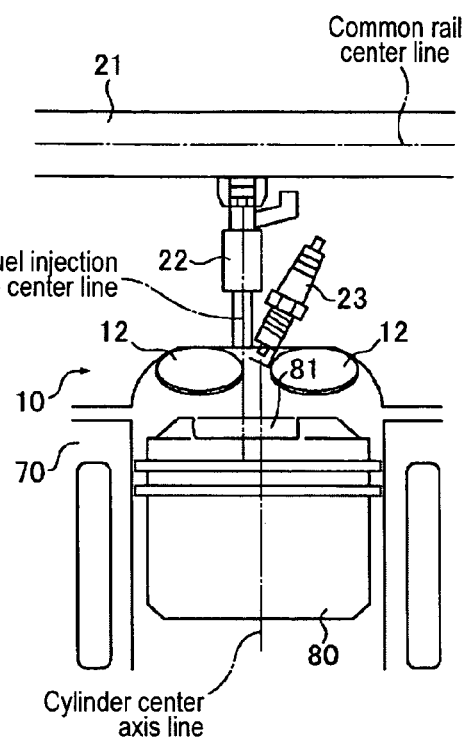
FIG. 3A
FIG. 3B
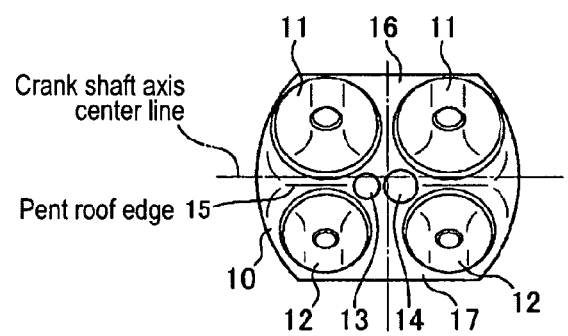
FIG. 3C

IN-CYLINDER DIRECT FUEL-INJECTION ENGINE

CROSS-REFERENCE TO RELATED APPLICATIONS

This application claims priority from Japanese Patent Application Ser. No. 2005-304731 filed Oct. 19, 2005, the disclosure of which, including its specification, drawings and claims, is incorporated herein by reference in its entirety.

TECHNICAL FIELD

The present disclosure is related to an in-cylinder direct fuel-injection engine.

BACKGROUND

As disclosed in Laid Open Japanese Patent No. H10-220229, in a conventional in-cylinder direct fuel engine, an ignition plug is disposed between two intake air ports. Due to the configuration described above, the opening diameter of the intake air ports (and thus the diameter of an intake air valve) is somewhat limited in size. The reduction of size of the intake air ports adversely reduces intake air efficiency of the engine.

SUMMARY

An in-cylinder direct fuel injection engine is disclosed. The engine comprises a fuel injection valve, a cylinder head, a fuel injection nozzle, and an ignition plug. The fuel injection valve injecting fuel is attached to the fuel rail and faces the combustion chamber through the fuel injection hole. The fuel injection hole and the ignition hole are positioned in a central portion of the a roof of the cylinder head so as to be located between an intake and exhaust air ports and are generally aligned along an axis of a crank shaft. Because the ignition hole is positioned between the intake and exhaust air ports, the diameter of the intake air ports may be increased.

BRIEF DESCRIPTION OF DRAWINGS

Other features and advantages of the present system will be apparent from the ensuing description, taken in conjunction with the accompanying drawings, in which:

FIG. 3A is a cross-sectional view illustrating a layout of a fuel injection valve and an ignition plug in a cylinder taken along line IIIA-IIIA of FIG. 1A.

FIG. 3B is cross-sectional view illustrating the layout of the fuel injection valve and ignition plug of FIG. 3A, viewed from an intake air side of the engine.

FIG. 3C is a plan view of a cylinder head, viewed from a fuel combustion chamber side of the engine.

DETAILED DESCRIPTION

Figure 1A:
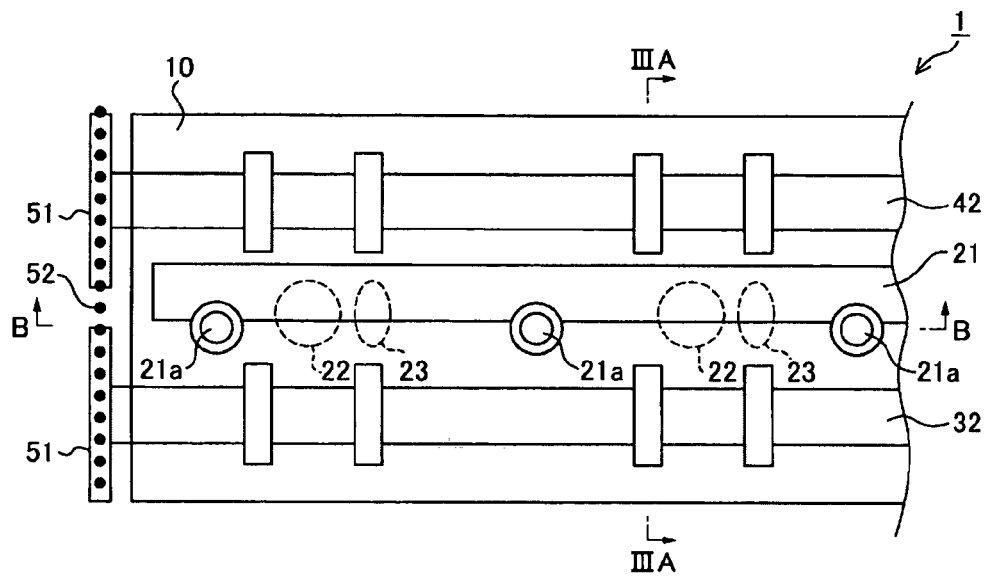
FIG. 1A is a top plan view of a cylinder head of an in-cylinder direct fuel injection engine according to a first embodiment.

While the claims are not limited to the illustrated embodiments, an appreciation of various aspects of the system is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

First Embodiment

Figure 1B:
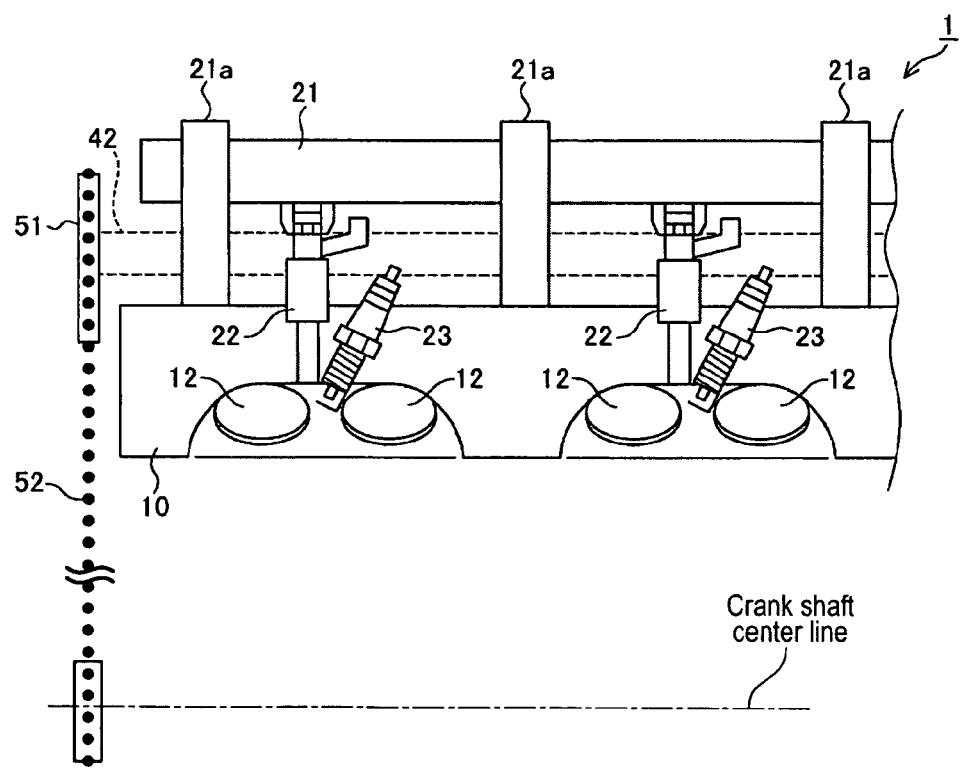
FIG. 1B is a cross-sectional view of the cylinder head taken along line B-B of FIG. 1A.

Referring to FIGS. 1A and 1B, a first embodiment of an in-cylinder direct fuel injection engine 1 is disclosed. FIG. 1A is a top plan view of a cylinder head 10. FIG. 1B is a cross-sectional view of cylinder head 10, taken along line B-B of FIG. 1A.

As illustrated, engine 1 is a multiple cylinder engine. For illustrative purposes, two of the multiple cylinders on a cam driving mechanism side of engine 1 are shown in FIGS. 1A and 1B. However it is understood that engine 1 may have more than two cylinders.

Disposed on cylinder head 10 are fuel injection valves 22, ignition plugs 23, intake air valve cams 32, exhaust air valve cams 42 and a fuel rail 21. As may be seen, each cylinder has associated with it, a fuel injection valve 22 having a fuel injection nozzle, and an ignition plug 23.

As best seen in FIG. 1B, fuel rail 21 is a common fuel rail that is generally aligned along an axis that extends through a crank shaft (i.e., a cylinder alignment line direction). In other words, a center line of fuel rail 21 is formed so as to be approximately parallel to the rotation axis of the crank shaft. In addition, a distance between the center line of fuel rail 21 and a center axis line of each cylinder is greater than a distance between a center line of the fuel injection hole 13 and the center axis line of the cylinder, as shown in FIG. 3A.

In one embodiment, fuel rail 21 may further comprise a plurality of boss portions 21a integrally formed thereon. In boss portions 21a, holes are formed so that attachment mechanisms, such as bolts, penetrate these holes respectively, thereby securing fuel rail 21 to cylinder head 10. In addition, surfaces where each boss 21a is brought into contact with cylinder head 10 are formed so as to be on the same plane. This structure increases assembly accuracy. Further, sealability of fuel injection valves 22 to fuel rail 21 is also improved, thereby preventing fuel from leaking from fuel rail 21.

As may be seen in FIG. 1A, each fuel injection valve 22 is disposed between boss portions 21a. First, one end of the fuel injection valves 22 are installed in fuel rail 21, as described below, and, once connected to fuel rail 21, a second end of fuel injection valves 22, are inserted into respective through holes formed in cylinder head 10. Fuel injection valves 22 are fixed to cylinder head 10 by the cooperation of the attachment mechanisms penetrating through bosses 21a so that fuel injection valves 22 are fixed thereto due to a compression force of fuel rail 21. Since the fuel injection valves 22 are disposed between boss portions 21a as described above, fuel injection valves 22 are not cantilevered. Therefore, even though combustion force acts on fuel injection valves 22, a bending force is not applied to fuel rail 21.

As shown in FIG. 1B, when viewing fuel injection valves 22 in a direction perpendicular to the crank shaft axis, fuel injection valves 22 are disposed so as to form approximately right angles with respect to cylinder head 10 and fuel rail 21, respectively. In other words, an axis extending through fuel injection valve 22 are approximately perpendicular to the fuel rail 21 center line (as best seen in FIG. 3A). Therefore, even though fuel injection valves 22 receive a combustion force, no bending force to the fuel injection valve body is generated.

Ignition plugs 23 are generally aligned along the crank shaft axis together with fuel injection valves 22. A terminal at the top of each ignition plug 23 is inclined so as to be spaced away from an adjacent fuel injection valve 22. Ignition plugs 23 are provided so as to be spaced away from a cam driving mechanism (which comprises sprockets 51 and chain 52), as compared with fuel injection valves 22. Thus, each ignition plug 23 is disposed so as to be away from the cam driving mechanism, as best seen in FIG. 1A. With this arrangement sprockets 51 and chain 52 may be properly positioned so as to operate intake and exhaust air valve cams 32, 42 without interference from ignition plugs 23.

Indeed, intake air valve cam 32 and the exhaust air valve cam 42 are operated by the cam driving mechanism, which comprises sprockets 51 and chain 52. More specifically, sprockets 51 are attached to an end of intake air valve cam 32 and an end of the exhaust air valve 42. The rotation of the crank shaft is transmitted to sprockets 51 through chain 52 so as to drive intake air valve cam 32 and exhaust air valve cam 42.

Figure 2:
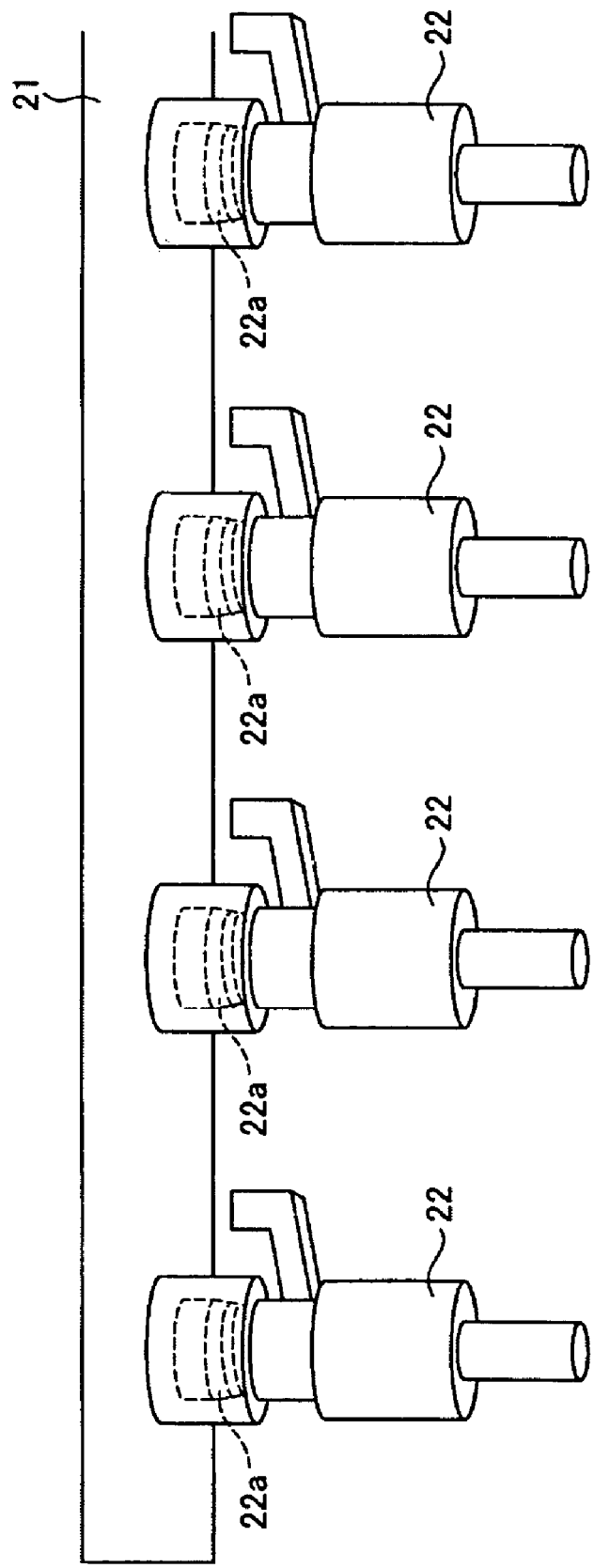
FIG. 2 is a perspective view of a plurality of fuel injection valves attached to a fuel pipe.

As may be seen in FIG. 2, which illustrates the attachment of fuel injection valves 22 to fuel rail 21, each fuel injection valve 22 is disposed through a seal 22a without inclining with respect to the axis extending through fuel rail 21. Each fuel injection valve 22 is arranged to as to be disposed generally perpendicular to fuel rail 21. In addition, in one embodiment, two or more fuel injection valves 22 are directly connected to one common fuel rail 21, so that a separate link pipe is not necessary. Thus, use of a common fuel rail 21 permits a reduced number of parts, which may also translate into a reduction in cost. Indeed, when the engine 1 is manufactured, it is possible to attach the fuel injection valves 22 to the common fuel rail 21, first, and then fix them together with the common fuel rail 21 to cylinder head 10 so that the number of assembly processing steps may be reduced.

Turning now to FIGS. 3A, 3B, and 3C, a layout of a fuel injection valve 22 and an ignition plug 23 in a single cylinder is shown. Engine 1 includes cylinder head 10, a cylinder block 70, and a piston 80. Piston 80 has a cavity 81 disposed therein. In one embodiment, cavity 81 has a generally circular shape when viewed from the top of cylinder head 10. A center of the cavity 81 is positioned, in a cylinder axis direction, under an injection point of a tip of the fuel injection valve 22.

An intake side roof 16 and an exhaust side roof 17 are formed in cylinder head 10 so as to form a pent roof. An edge line (ridgeline) 15 of the pent roof is located between intake side roof 16 and exhaust side roof 17. As may be seen in FIG. 3C, in one embodiment, edge line 15 is slightly offset from crank shaft axis.

Intake air ports 11 are formed in intake side roof 16. Exhaust air ports 12 are formed in exhaust side roof 17. Intake air ports 11 are opened/closed by intake air valve 31, which is driven by intake air valve cam 32. Exhaust ports 12 are opened/closed by exhaust air valve 41 that is driven by exhaust air valve cam 42. Additionally, a fuel injection valve 22 and an ignition plug 23 are attached to the cylinder head 10.

Fuel injection valves 22 inject fuel supplied from the high pressure common fuel rail 21. Fuel injection valves 22 inject fuel from the fuel injection nozzle facing the combustion chamber through the fuel injection hole 13. The fuel injection valve 22 is pressed by fuel rail 21 located above fuel injection valve 22.

Ignition plug 23 faces a fuel combustion chamber formed in cylinder head 10 through an ignition hole 14 (as seen in FIG. 3C) formed adjacent to the fuel injection hole 13. Ignition plug 23 is disposed at a position where the ignition portion at the tip thereof is adjacent to the fuel injection valve 22, and fuel injected from the injection nozzle of fuel injection valve 22 can be directly ignited, or an air-fuel mixture may be generated to form a fuel mist, whereby the fuel mist may be ignited.

As shown in FIG. 3C, fuel injection hole 13 and ignition hole 14 are positioned so as to be slightly offset toward an exhaust air port side from the crank shaft axis center line. That is, the center of fuel injection hole 13 and ignition hole 14 are formed in the exhaust air side roof 17. In addition, fuel injection hole 13 is formed on a side of the cam driving mechanism from the center of the fuel combustion chamber. The ignition hole 14 is formed on an opposite side to the cam driving mechanism from the center of the fuel combustion chamber. Because the ignition hole 14 is not disposed between intake air ports 11, this arrangement permits the opening area of intake air port 11 to be larger than exhaust air port 12. The increase size of the opening area of intake air port 11 permits improved intake air efficiency such that the output power of engine 1 may be improved.

Further, since fuel injection valve 22 is disposed on a cam driving mechanism side of cylinder head 10, and ignition plug 23 is disposed on a side opposite to the cam driving mechanism, it is possible to position fuel injection valve 22 and ignition plug 23 in a space formed between two intake air ports 11 and two exhaust air ports 12 in a balanced manner. Therefore, it is possible to maintain an appropriate distance from each air valve, each port, each valve seat and the like, so that appropriate thicknesses of various parts of the cylinder head 10 may be obtained to increase durability of the engine.

Figure 4:
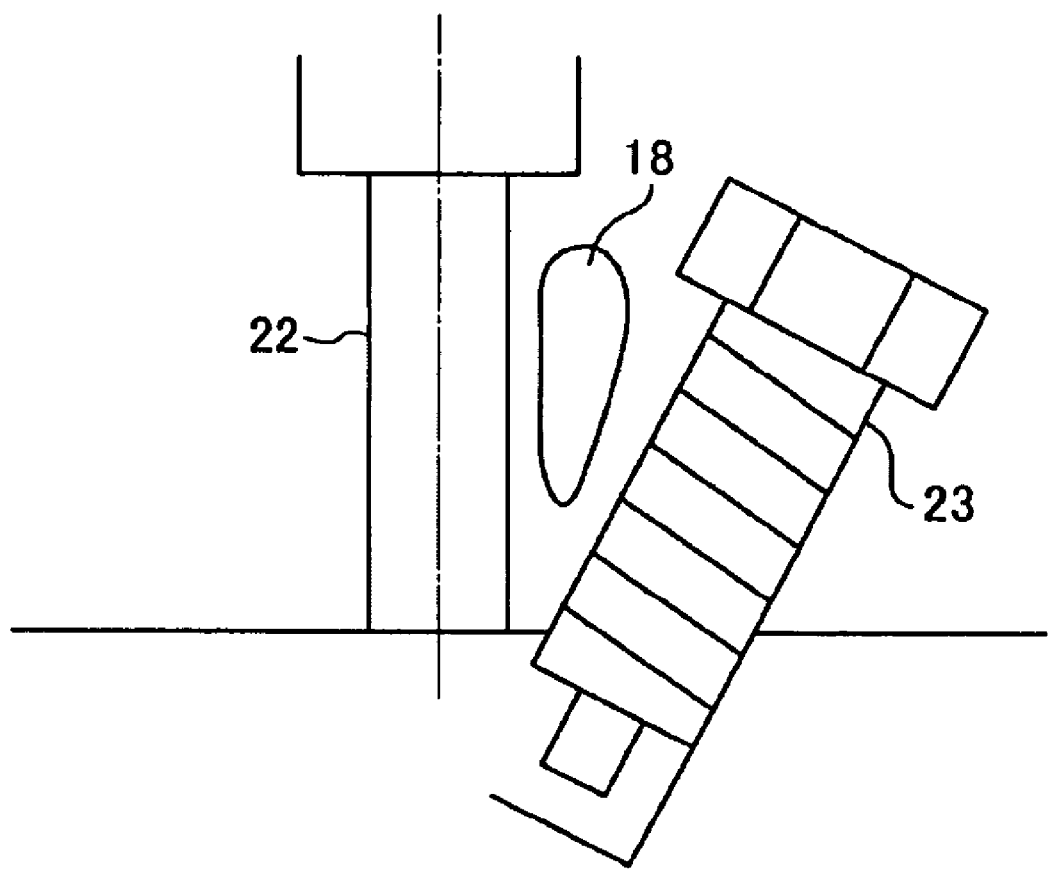
FIG. 4 is an enlarged representative view of a fuel injection valve and an ignition plug.

FIG. 4 is an enlarged view of an area surrounding the tip of fuel injection valve 22 and the ignition plug 23. As may be seen, a space for a water path 18 between fuel ignition valve 22 and ignition plug 23 is defined due to incline of ignition plug 23. The cooling capability of fuel ignition valve 22 and the ignition plug 23 is enhanced by the inclusion of water path 18, and it is possible to avoid caulking of fuel injection valve 22 or knocking. In addition, if a fuel injection valve 22 having a relatively long tip portion is used, the space for water path 18 may be further enlarged, thereby further improving the cooling capability.

As described above, the in the first embodiment of in-cylinder direct fuel injection engine 1, fuel injection valve 22 is inclined toward only the side of exhaust air valves 41 when viewing from the crank shaft direction (FIG. 3A). When viewing engine 1 from a direction perpendicular to the crank shaft direction, fuel injection valve 22 is provided to form an approximately right angle with respect to cylinder head 10 and common fuel rail 21 (FIG. 3B). Therefore, the combustion pressure acts in a direction perpendicular to fuel rail, so that it does not act as a force to bend fuel injection valve 22 with respect to common fuel rail 21. Accordingly, this configuration improves sealability between fuel injection valve 22 and the common fuel rail 21.

If fuel injection valve 22 is not inclined when viewing engine 1 from the crank shaft direction, the distance between fuel injection valve 22 and ignition plug 23 becomes too small. Indeed, in such a case, to accomplish a layout of a fuel injection valve 22 and a ignition plug 23, the ignition plug 23 would need to be substantially inclined toward the side of intake air valve 31 so that an appropriate distance between the ignition plug 23 and the fuel injection valve 22 may be accomplished. However, in such a structure, the size of intake air port 11 may be adversely reduced. In addition, it is difficult to achieve a layout of intake air valve 31 and exhaust air valve 41, which may result in an open angle of intake air valve 31 and exhaust air valve 41 becomes undesirably large. In such instances, the depth of the combustion chamber increases, such that the surface area of the combustion chamber increases. The increase in surface area of the combustion changer increases cooling loss resulting in a deterioration of gas mileage.

In addition, while it is possible to accomplish a layout of fuel injection valve 22 and ignition plug 23 by using a link pipe instead of directly connecting fuel injection valve 22 to common fuel rail 21, the addition of a link pipe increases the number of the parts, the cost of parts, as well as increasing the number of the manufacturing steps.

Therefore, in the first embodiment of in-cylinder direct fuel injection engine 1, by inclining fuel injection valve 22 toward the side of the exhaust air valve 41 (FIG. 3A), in which fuel injection valve 22 is provided so as to form an approximately right angle with cylinder head 10 and common fuel rail 21 (FIG. 3B), the problem of potential reduction of the size of intake air port 11 may be eliminated.

In addition, fuel injection hole 13 and ignition hole 14 are formed around the approximate center of the roof located between the openings of intake air ports 11 and the exhaust ports 12 of cylinder head 10, on the exhaust air side of cylinder head, and provided so as to be generally aligned along the direction of the crank shaft (i.e., parallel to the crank shaft axis center line shown in FIG. 3C). Therefore, it is possible to enlarge the openings of intake air ports 11 (i.e., increase the intake air valve diameter), so that intake air efficiency is not compromised. In addition, in a uniform driving condition in which fuel is injected during an air intake process, the fuel is hard to attach to the side wall of the cylinder. Thus, it is possible to prevent deterioration of lubricating ability due to increase of blow-by gas or thinness of gasoline.

Figure 5A:
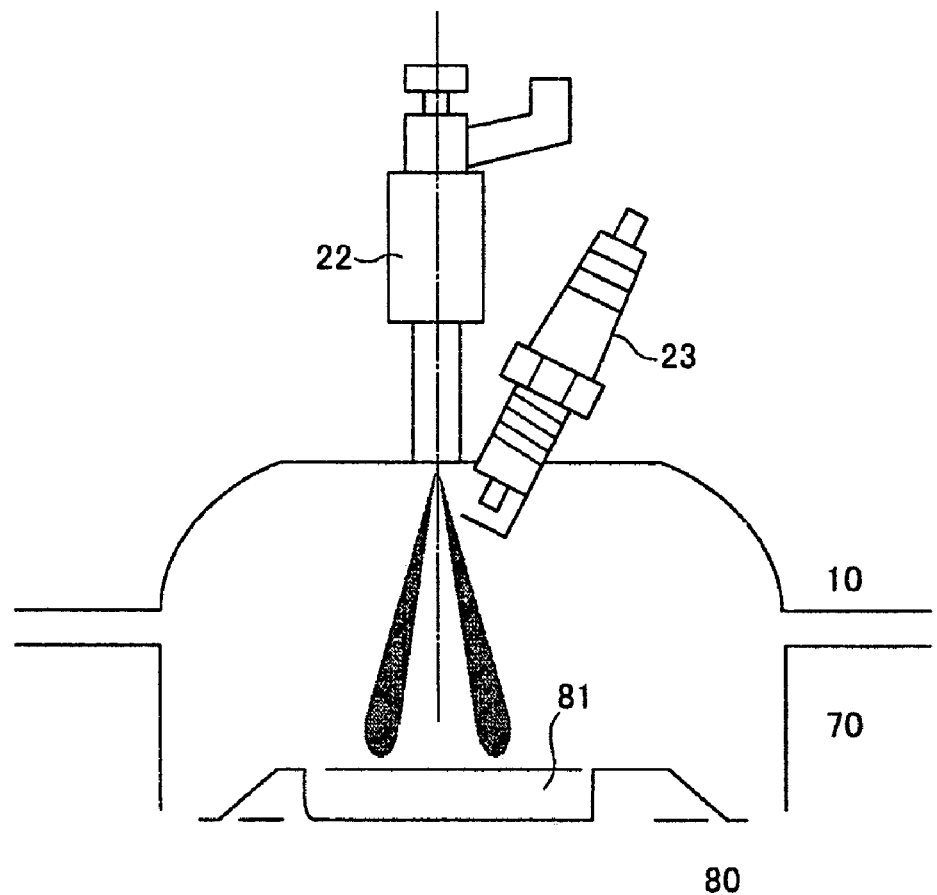
FIGS. 5A and 5B illustrate a gas layer formed during a driving condition.
Figure 5B:
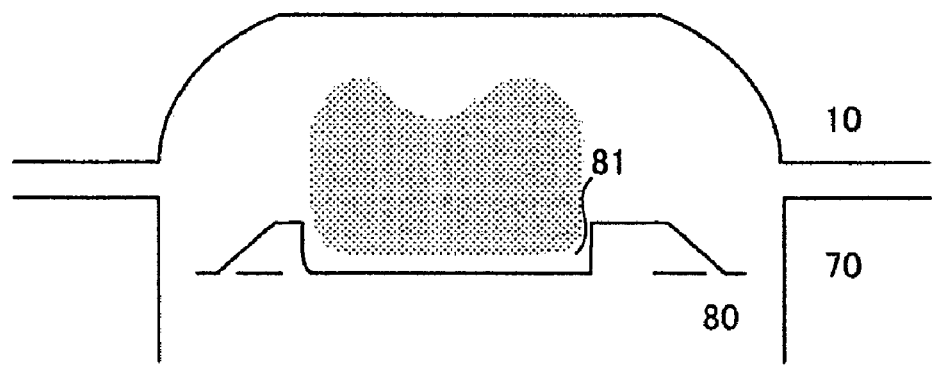

Referring to FIGS. 5A and 5B, when in a fuel injection valve 22, fuel is injected in the cylinder axis line direction without regard to inclination of the main body, that is, below the combustion chamber is inclined, effects described below can be obtained. When a multi-hole injection valve is used, it is possible to inject the fuel in the cylinder axis line direction, without regards to the inclination of the main body. In addition, the fuel may be injected in a late compression process and around the top dead center (for example, 20 deg BTDC).

In such a manner, after the fuel injected for the fuel injection valve 22 collides with cavity 81, it is spread above the cavity 81 in the air. The bounced mist forms an isotopic mixture air cluster without uneven density in the cavity.

Second Embodiment

Figure 6A:
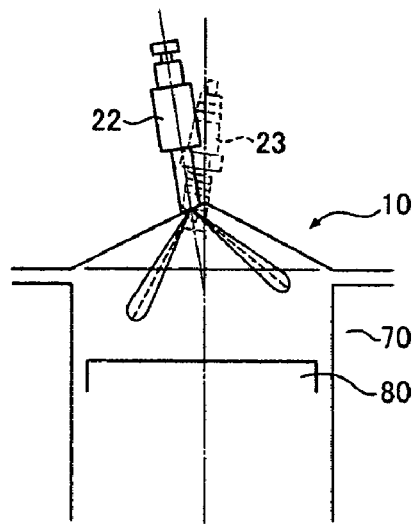
FIGS. 6A-6C illustrate a second embodiment of an in-cylinder direct injection engine, viewed from a front side of the engine.
Figure 7A:
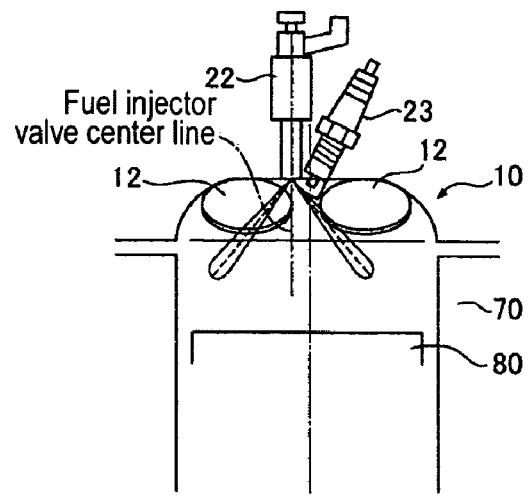
FIGS. 7A-7C further illustrate the second embodiment of the in-cylinder direct injection engine, viewed from an intake air side of show a second embodiment of an in-cylinder direct injection engine according to the present invention.
Figure 6B:
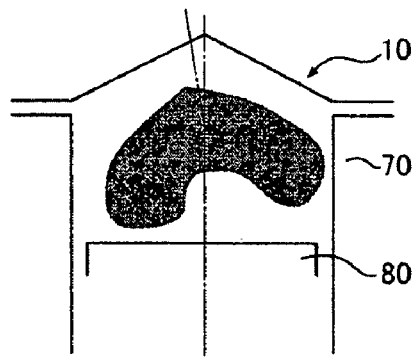
Figure 7B:
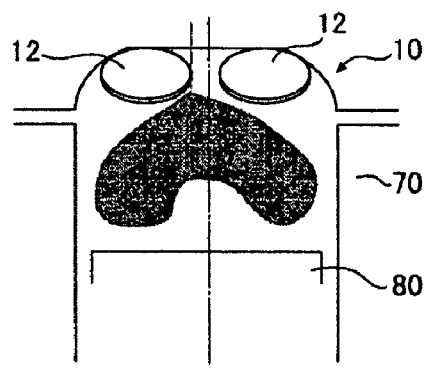
Figure 6C:
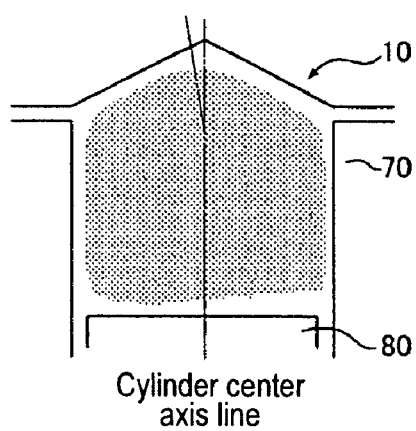
Figure 7C:
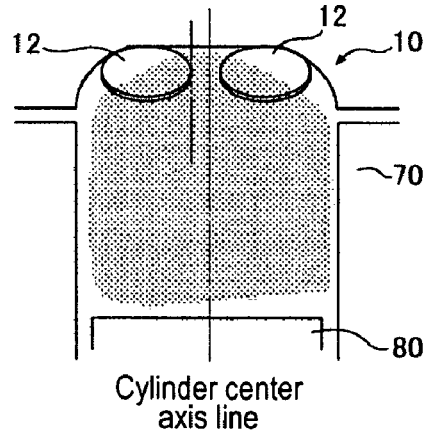

FIGS. 6A-6C and 7A-7C illustrate a second embodiment of the in-cylinder direct fuel injection engine. FIGS. 6A-6C are diagrams viewed from the front side of the engine, corresponding to FIG. 3A. FIGS. 7A-7C are diagrams viewed from an intake air side of the engine, corresponding to FIG. 3B. In addition, FIG. 6A and FIG. 7A illustrate a state in which fuel is injected and the piston is at the top dead center of the combustion chamber. FIGS. 6B and 7B illustrate a state in which a piston is moving downwardly. FIGS. 6C and 7C illustrate a state in which the piston positioned at the bottom of the combustion chamber.

The same numerals are used for the respective elements having similar features to those of the first embodiment described above and description thereof is omitted.

The layout of the respective parts according to the second embodiment is the same as that of the first embodiment. Fuel injection valve 22 used for the present embodiment, injects fuel in the center axis direction of the injection valve. In addition, a uniform driving is carried out during a process of the fuel injection.

According to the present embodiment, the body of the fuel injection valve 22 is inclined toward the side of the exhaust air valve 41 as shown in FIG. 6A. Therefore, the fuel injection valve 22 injects the fuel against the intake air. If the fuel injection valve 22 is inclined toward the side of the intake air valve 31, the fuel injection valve 22 injects the fuel toward the intake air direction. In such a case, the fuel tends to adhere to the side wall of the cylinder on the exhaust port side since the fuel flows with the intake air, so that there is a possibility that a blow-by gas increases.

However, according to the present embodiment, since the main body of the fuel injection valve 22 is inclined toward the side of the exhaust air valve 41, as shown in FIG. 6B, it is difficult for the fuel to adhere to the side wall of the cylinder so that deterioration of lubricating ability due to increase of the blow-by gas or dilution of gas can be prevented. In addition, mixture with intake air is promoted so that exhaust emission can be decreased and output power is enhanced.

In addition, since the fuel is injected in a center axis line direction of the injection valve 22, the fuel is injected against the intake air; the fuel can be injected across a wide area so that it is possible to prevent uneven density of mixed air in the cylinder (FIGS. 6C and 7C).

The preceding description has been presented only to illustrate and describe exemplary embodiments of the exhaust system according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. An in-cylinder direct injection engine comprising:
a fuel rail;
a fuel injection valve attached to the fuel rail so as to inject fuel with the injection valve being engaged with a fuel injection hole that is positioned in a central portion of a roof of a cylinder head so as to be located between openings of an intake air port and an exhaust air port with a center axis of the fuel injection valve being inclined with respect to a center axis extending through a cylinder; and
an ignition plug engaged in an ignition hole that is positioned in the central portion of the roof between openings of the intake air port and the exhaust air port,
the fuel injection hole and the ignition hole being generally aligned along an axis of a crankshaft,
the fuel injection valve being attached to the fuel rail with the center axis of the fuel injection valve generally orthogonally intersecting an axis extending through the fuel rail,
the ignition plug being inclined with respect to the fuel injection valve when viewed from a direction perpendicular to a rotational axis of the crankshaft and perpendicular to the center axis extending through the cylinder with a water pathway being formed in the cylinder head and with the water pathway being at least partially aligned between the ignition plug and the fuel injection valve.

2. The in-cylinder direct injection engine according to claim 1, wherein the fuel rail extends generally parallel to a rotational axis of the crank shaft.

3. The in-cylinder direct injection engine according to claim 1, wherein
the fuel injection hole and the ignition hole are formed in an exhaust side portion of the roof of the cylinder head.

4. The in-cylinder direct injection engine according to claim 1, further comprising
a cam driving mechanism that is driven by the crankshaft, wherein the cam driving mechanism selectively opens and closes an intake air valve.

5. The in-cylinder direct injection engine according to claim 4, wherein
the ignition hole is disposed so as to be spaced away from the cam driving mechanism when viewed from the direction perpendicular to the rotational axis of the crank shaft and perpendicular to the center axis extending through the cylinder.

6. The in-cylinder direct injection engine according to claim 1, wherein
the fuel rail further comprises a boss portion and wherein the fuel rail is fixedly attached to the cylinder head by a fastening mechanism that penetrates the boss portion so as to apply pressure to the fuel injection valve to frictionally retain the fuel injection valve between the fuel rail and the cylinder head.

7. The in-cylinder direct injection engine according to claim 1, further comprising
a seal member that is attached to the fuel rail, wherein an end of the fuel injection valve is received within the seal to attach the fuel injection valve to the fuel rail.

8. The in-cylinder direct injection engine according to claim 1, wherein
the fuel rail is a common rail and a plurality of fuel injection valves are connected thereto.

9. The in-cylinder direct injection engine according to claim 8, further comprising
a plurality of boss portions positioned on the fuel rail, wherein the boss portions are spaced from one another, and wherein the plurality of fuel injection valves are connected to the fuel rail such that adjacent fuel injection valves are separated by one of the boss portions.

10. An in-cylinder direction injection engine comprising:
a fuel delivery means;
a fuel injection means operatively connected to the fuel delivery means so as to inject fuel from the fuel delivery means with the fuel injection means being engaged in a fuel injection hole positioned in a central portion of a roof of a cylinder head so as to be located between openings of an intake air port and an exhaust air port with a center axis of the fuel injection means being inclined with respect to a center axis extending through a cylinder; and
an ignition means engaged in an ignition hole that is positioned in the central portion of the roof between openings of the intake air port and the exhaust air port, the fuel injection hole and the ignition hole being generally aligned along a common axis,
the fuel injection means being attached to the fuel delivery means with the center axis of the fuel injection means generally orthogonally intersecting an axis extending through the fuel delivery means,
the ignition means being inclined with respect to the fuel injection means when viewed from a direction perpendicular to the common axis and perpendicular to the center axis extending through the cylinder with a water pathway being formed in the cylinder head and with the water pathway being at least partially aligned between the ignition means and the fuel injection means.

11. A method of assembly of an in-cylinder direct injection engine, comprising:
providing a fuel rail;
securing one or more fuel injection valves to the fuel rail so that a center axis of the fuel injection valve generally orthogonally intersects an axis extending through the fuel rail and the center axis of the fuel injection valve is inclined with respect to a center axis extending through a cylinder;
positioning a fuel injection hole in a central portion of a roof of a cylinder head so as to be located between an intake air port and an exhaust air port with the fuel injection hole permitting injection of fuel received by the fuel injection valve from the fuel rail into a combustion chamber of a cylinder head; and
positioning an ignition plug in an ignition hole that is formed in a central portion of the roof of the cylinder head so as to be located between the intake air port and the exhaust air port so that the fuel injection hole is aligned with the ignition hole along a common axis, and the ignition plug is inclined with respect to the fuel injection valve when viewed from a direction perpendicular to the common axis and perpendicular to the center axis extending through the cylinder with a water pathway being formed in the cylinder head and with the water pathway being at least partially aligned between the ignition plug and the fuel injection valve.

12. The method of claim 11, further comprising:
providing the fuel rail with boss portions that each receive a fastening mechanism;
securing a portion of the fastening mechanisms to the boss portions; and
securing a second portion of the fastening mechanism to a portion of the cylinder head to connect the fuel rail to the cylinder head.

13. The method of claim 11, further comprising
positioning the fuel injection valve so as to be inclined toward an exhaust side of the cylinder head when viewed from form a direction along a rotational axis of a crank shaft.

14. The method of claim 11, further comprising positioning a tip of the ignition plug is positioned adjacent to the fuel injection hole.

* * * * *